July 29, 1941.   R. B. CHASE   2,251,035
MITERING ATTACHMENT FOR TABLE SAWS
Filed March 18, 1940   2 Sheets-Sheet 2
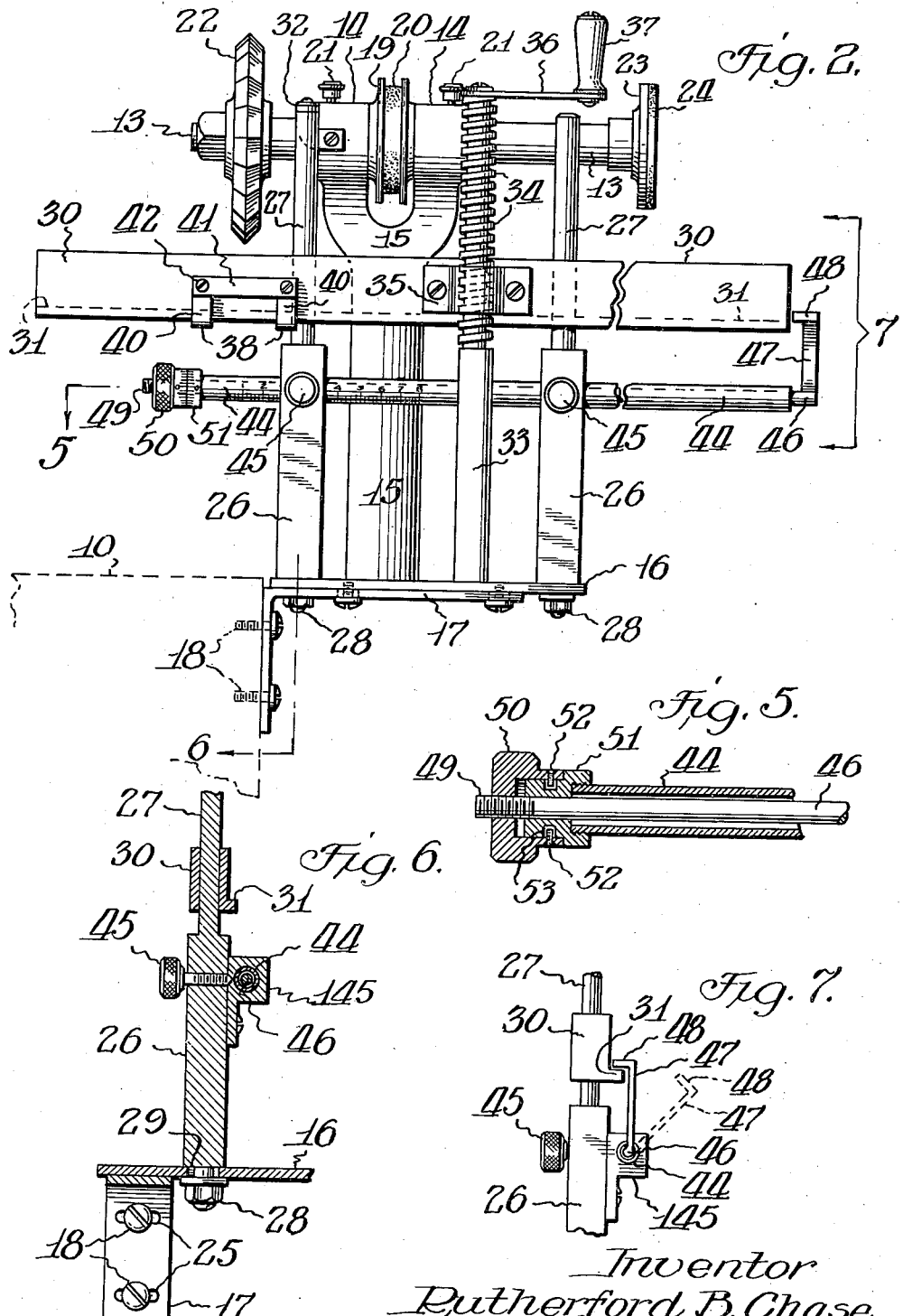
Inventor
Rutherford B. Chase
by His Attorney Patented July 29, 1941

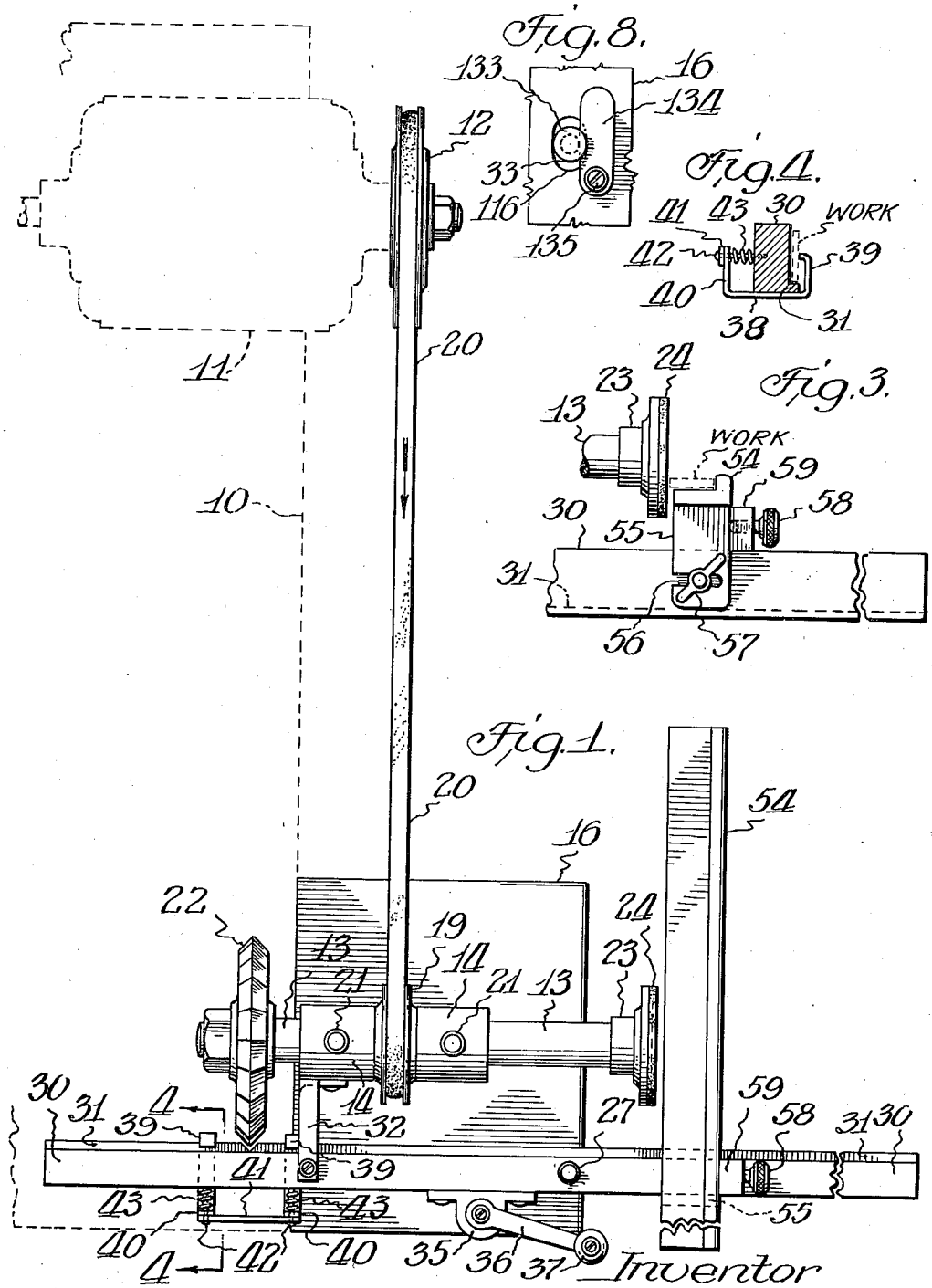

2,251,035

UNITED STATES PATENT OFFICE 2,251,035

MITERING ATTACHMENT FOR TABLE SAWS

Rutherford B. Chase, Chicago, Ill.

Application March 18, 1940, Serial No. 324,659

4 Claims. (Cl. 90—18)

My present invention relates to metal cutting machines; and particularly to those used in the composing rooms of printers' shops for cutting and beveling the ends of printers' rules, trimming, undercutting and mortising Linotype slugs and the like, and finishing and burnishing the type face; and specifically to an appendage for the present composing room table saw, providing a mitering and type burnishing attachment, which is installed as an accessory to the present saw and employs to the table of the saw as a work bench, using the motor of the saw for driving the cutting and burnishing tools of the accessory without dismantling the saw or impairing its continued and uninterrupted use, and has among its objects:

The elimination of a separate mitering tool, and the combining of an efficient miter and burnisher with the present saw, thus effecting considerable saving in floor space in an already crowded work room and at an appreciable reduction in investment for equipment; with an increase in the production efficiency of the workman; and The provision of an efficient miter, work-vice and miter-gauge, combined in a compact unit with a burnishing tool and work holder, permitting of fine, accurate adjustment of the related parts; and The production of a manually operable feed for the work holder, whereby the work may be fed to the cutting tool in an even and positive fashion against the direction of rotation of the cutter and in a vertical plane so that the load or impact created in cutting will be carried downwardly and direct to the support and thus eliminate chattering with the resultant ragged cutting and mitering of the work, producing a smooth, even, and accurate cut which is so imperative for this type of work; and The building of a new and novel spring actuated vice for firmly holding the work, and whereby the strip or rule is prevented from spreading apart during the mitering operation; and The design of a caliper gauge or rule, with vernier attachment and adjusting screw for very fine measurement and gauging of the work to be cut or mitered, and whereby the work and work holder moves into and out of cutting position freely and independently of the gauge, so that the gauge is never subjected to abuse or destruction due to the cutting operation, as is so often the case when the measuring device forms a part of the work holder.

My invention has these and other objects, all of which are explained in detail and may be more readily understood when read in conjunction with the accompanying drawings (two sheets), which illustrate a preferred embodiment of my invention, it being manifest that changes and modifications may be resorted to without departure from the spirit of the claims forming a part hereof. Similar reference characters refer to similar parts throughout. And while I describe my invention in a preferred embodiment, it is to be understood that the words I use are words of description and not of limitation.

In the drawings:

Fig. 1 is a plan view of my mitering attachment or accessory shown assembled to the conventional form of composing room table saw, a portion of the table saw with its motor is shown in dotted lines as forming no part of my invention, and the usual emery wheel carried by the motor is not shown but has been replaced with a drive pulley;

Fig. 2 is a front elevational view of the accessory shown in Fig. 1, but the work table for the burnishing wheel has been omitted to shorten the length of the carriage to better illustrate the gauging mechanism;

Fig. 3 is a fragmental elevation of the work table for the burnishing wheel as omitted in Fig. 2;

Fig. 4 is a section on line 4—4 of Fig. 1 illustrating the details of the work holder or work-vice, the work being shown in dotted lines;

Fig. 5 being an enlarged section through the vernier adjusting screw taken on line 5 of Fig. 2;

Fig. 6 is a vertical section of the lower portion of the column and carriage showing the adjustable bearing for the gauge and the adjustable mounting of the column to the base plate taken on line 6 of Fig. 2;

Fig. 7 is an end elevational view of the gauge shown in its relation to the carriage in both operative and inoperative position taken on line 7 of Fig. 2; and Fig. 8 is a bottom plan illustrating only a portion of the base plate and the laterally adjustable shaft revolvably mounted thereon.

It is my purpose to build and attach my device to the commonly accepted type of composing room table saw comprising a horizontally disposed table top 10, which is mounted a convenient height above the floor, and which includes a metal saw partly projecting through the table top, the saw being directly connected to a drive motor 11. The material to be sawed is fed horizontally along the table top and into engagement with the saw. The end of the motor shaft opposite to that carrying the saw and which usually carries an emery wheel, is now fitted with a drive pulley 12, from which my device is driven.

I choose to build my mitering attachment as an accessory to this saw, and which accessory includes a mandrel in the form of a horizontally disposed spindle 13, journalled in a pair of spaced apart bearings 14—14, carried by a vertical supporting column 15, which in turn is fixedly mounted upon a base plate 16, adjustably supported by brackets 17, which are bolted at 18, or otherwise secured to the table 10 so that the base plate 16 will be rigidly held substantially flush with the top of the table saw. Secured to the spindle 13 intermediate the spaced bearings 14—14 is a drive pulley 19, which connects by means of the belt 20, with the pulley 12 on the motor, and from which the spindle is driven in a counter-clockwise direction as indicated by the arrow (Fig. 1). Grease cups 21 are provided as a means for feeding a lubricant to the spindle at the bearings, thus completing the mandrel. The spindle overhangs its bearings, and on one end thereof is attached a miter cutting wheel 22, and on the opposite end of the spindle is attached a burnishing wheel 23. The mitering wheel is of the usual form and shape of cutters of this class, whereas the burnishing wheel is preferably constructed in the form of a circular shaped flat metal disc faced with a grit impregnated rubber disc 24, substantially concave or dished, as indicated in dotted lines (Fig. 1). Each wheel is removably secured to the spindle in the usual manner for replacement. And in order to take up any slack in the belt due to stretching, I provide slots 25 in the brackets 17 through which pass the cap screws 18 which permit of adjusting the distance between the pulleys 12 and 19.

Positioned directly in front of the mandrel is a work carriage and carriage support comprising a pair of vertically disposed spaced apart columns 26—26, the upper portions of which are turned down to provide guides 27—27, and the lowermost portion or base of each column is adjustably secured to the base plate 16 by means of the stud bolts 28, which pass through the slotted openings 29, in the base plate. The columns 26 are in line in a vertical plane substantially parallel to the major axis of the spindle 13, and by means of their adjustable connection to the base plate just described, are adjustable both towards and away from the mandrel to regulate the depth of cut desired. The work holder carriage consists of a relatively horizontally disposed L-shaped bar 30, having an offset base or table portion 31 facing the side adjacent the mandrel. The bar 30 is carried by and vertically movable upon the horizontally adjustable guides 27—27 which pass through and have bearing in the bar 30. The uppermost end portion of one guide 27 is preferably, but not necessarily, reinforced or braced by means of a bracket 32 connecting that end to one of the bearings 14 of the mandrel as shown; this also serves as a limit stop for the carriage in its upward movement.

As a suitable means for moving said carriage 30 in a vertical plane upon the guides 27—27, and whereby the work is brought into engagement with the cutting wheel 22, I preferably provide a vertically disposed shaft 33, revolvably mounted to the base 16 (Fig. 8), and the lower-most portion of said shaft protrudes through a slot 116 cut in the base; a peripheral groove 133 is cut into the shaft, and in this groove rides a pawl or key 134 which is pivotally connected at 135 to the underside of the base 16, thus providing both a pivotal or revolvable connection for the shaft to the base plate and at the same time this connection permits the shaft to be adjusted horizontally to follow the adjustment of the columns 27—27 to regulate the depth of cut desired. The upper portion of the shaft 33, is exteriorly threaded at 34, which threaded portion is adapted to engage the threads of an interiorly threaded bearing block 35 which block is rigidly affixed to and becomes a part of the carriage 30, intermediate the guides 27—27.

The uppermost end of the shaft 33 is secured to one end of a lever arm 36, the opposite end whereof carries a handle 37, thus forming a crank whereby the shaft 33 may be manually rotated.

In order for the carriage to support the work in a proper manner, I provide a spring actuated work-vice adapted to firmly grip and hold the work (Fig. 4) and to prevent the strip or rule from shifting or moving while being cut or mitered. This vice is mounted upon the carriage 30 directly in front of the mitering wheel 22, and consists of a pair of spaced apart substantially U-shaped members each having a base portion 38 adapted to slidably engage the bottom face of the carriage 30 equidistant from the center of the cutting wheel 22. Each U-shaped member has a vertically disposed leg portion 39 adapted to extend along the inner face of the carriage and directly contact and engage the work (Fig. 4), and a like vertically disposed leg 40 extending upwardly and positioned away and spaced from the opposite face of the carriage. A cross-bar 41, connects the ends of each leg portion 40 by means of a pin 42 which is fixedly attached to the carriage and extends beyond the face thereof and which is slidably engaged by the bar 41 and the related end portion 40 of the U-shaped member; and a spring 43 is interposed between the face of the carriage and the bar 41 at each pin, so that the pressure exerted by the spring against the leg 40 will securely hold the work in its proper position upon the carriage by means of the clamping portion 39. As will be readily apparent, each U-shaped member of the vice will function independently of its associated member, so that after the work has been cut or mitered, each side of the cut is held independently of the other, and by the same means, if the operator is only beveling one end of a slug, regardless of which side of the miter he uses, the slug will always be held securely in place.

Sheet 2 of the drawings illustrates a preferred embodiment of my invention wherein a gauge is employed for determining and setting the length of slug required, or the distances between mortices in the same slug, and comprises a tube 44, slidably mounted parallel to the carriage 30 and substantially co-extensive therewith, in aligned bearings 145 which are attached to the columns 26 just below the lowermost position the carriage can attain in its vertical movement upon the columns. Set screws 45 are each threaded through their respective columns 26 and engage and lock the tube 44 against partial rotation and also against lateral sliding adjustment. A rod 46 is slidably carried within said tube and extends beyond each end thereof, and on one end is provided with a finger portion 47 extending at a right angle thereto and terminating in a tip 48 which extends back at an angle therefrom and is adapted to move in adjustment along the table 31 of the carriage 30. The opposite end of the rod 46 is threaded at 49 with a running thread to receive the threaded portion of the vernier adjusting nut 50, which nut is bored out to receive the barrel of its companion nut 51 which is threaded on to the end of the tube 44 (Fig. 5). Set screws 52—52, extend from the shoulder of the nut 50, into an annular groove 53 cut in the barrel of the companion nut 51, so that the nut 50 may be rotated with respect to its companion 51 and thereby impart a fine lateral adjustment to the rod 46. A vernier scale is marked upon the faces of the companion members 50 and 51 as indicated (Fig. 2) and a scale is also marked upon the outer surface of the tube member 44. The gauge is shown in operative position in Fig. 7 by full lines, but after the work has been gauged and clamped by the work-vice just described, the set screws 45 are loosened and the tube partially rotated until the finger 47 of the rod 46 is moved out of the way of the table 31 of the carriage 30, as indicated in dotted lines, whereupon the carriage is moved upwards whereby the work is engaged by the cutting wheel 22 and mitered.

Tools of this type, have in the past usually carried an emery wheel upon the mandrel; however, I now propose to supplant the customary emery wheel with the burnishing wheel 24 described in the first part of this specification, and to further provide a work table adapted specifically to carry the work to the burnishing wheel with both vertical and lateral adjustment. This I accomplish by means of the work table 54 (Sheet 1) which is adjustably mounted to the carriage 30 transverse to the path of travel of the carriage and substantially parallel to and adjacent the face of the burnishing wheel 24, and by means of the depending lug 55 which is slotted at 56 to receive a wing nut 57 carried by the carriage 30. A set screw 58 is threaded into a bracket or lug 59 protruding from the top face of the carriage 30 and bears against the face of the lug 55 to impart lateral adjustment thereto, whereby Linotype slugs, printers' rules and the like may be fed across the face of the wheel 24 and polished or burnished type high with a marked degree of accuracy.

From the foregoing it will be manifest that I have developed a new and novel device adapted— as an attachment to a table saw—to cut and miter printers' rules, Linotype slugs and the like in a manner and with a degree of accurateness not heretofore accomplished; that this device is relatively simple in construction and operation and readily adjustable; that I have successfully combined the carriage with a table for bringing the slug into engagement with a burnishing wheel, using the same means effecting movement for feeding in each case; and that I have improved on the type of feed by bringing the work upwardly in a vertical plane and against the direction of rotation of the cutting wheel so that the work will be fed to the wheel in an even and positive fashion, and so that the load or impact created in the cutting operation will be carried downwardly in a vertical plane directly through the support and thus eliminate vibration and so-called "chattering."

What I claim as new is:

1. A mitering attachment for a table saw comprising a rotatable spindle and a bearing therefor fixedly mounted upon a base constituting a mandrel operatively associated with and attached to said table saw, a pair of vertically disposed spaced apart columns laterally adjustable upon said base, a work-holder carriage movably mounted upon said columns in a vertical plane substantially parallel to the major axis of said spindle, a work-vice mounted upon and carried by said vertically movable carriage, a miter cutting wheel carried by said spindle and adapted to revolve in a plane substantially at right angles to the path of travel of said carriage and thereby adapted to engage the work held in said work-vice, and manually operable means for moving said carriage and the work carried thereby, in a vertical plane into engagement with said cutting wheel whereby the work will be fed to the cutting wheel in an even and positive fashion and against the direction of rotation of said wheel, said means comprising a horizontally adjustable and vertically disposed exteriorly threaded shaft revolvably mounted upon said base and an interiorly threaded bearing carried by said carriage adapted to engage the threads of said shaft whereby the rotation of said shaft will cause the carriage to move in a vertical plane upon said spaced apart columns.

2. A mitering attachment for a table saw as per claim 1, wherein the work-vice which is carried by said vertically movable carriage, comprises a pair of spaced apart substantially U-shaped clamping members each of which is adapted to have its base portion slidably engage the bottom of said carriage transverse to the path of travel of said carriage, a second portion or upstanding leg adapted to engage the work carried by said carriage, and a third portion or upstanding leg adapted to be spaced from the opposite side of said carriage, a cross-bar connecting the ends of each third portion, said connection consisting of a horizontally disposed pin carried by said carriage and adapted to pass through both said cross-bar and the related end of said third portion, and a spring member interposed between the end of each third portion and said carriage.

3. A mitering attachment for a table saw as per claim 1, which includes means for gauging the length of the work to be cut or mitered, said means consisting of a partially graduated tube member adjustably mounted upon said spaced apart columns parallel with said carriage and substantially co-extensive therewith, a slidably adjustable rod extending through said tube and beyond the ends thereof, a finger extending at an angle from one end of said rod and adapted to engage one end of the work upon said carriage, a vernier scale adjustment connecting the other end of said rod with the related end portion of said tube member, the means for adjustably mounting said tube to said columns consisting of a pair of aligned bearings mounted one on each of said columns and through which said tube is adapted to both move for lateral adjustment and partially rotate, and locking means for securing said tube against rotation and against lateral movement.

4. A mitering attachment for a table saw which includes a mandrel carrying a rotatable cutter, a work carriage for positioning the work in the path of the cutter, and a work vice for releasably holding the work upon the carriage, said vice consisting of a pair of spaced apart substantially U-shaped clamping members each of which is adapted to have its base portion slidably engage a portion of said carriage, one of the upstanding legs of each U-shaped member adapted to engage the work between itself and a portion of the carriage, and the remaining upstanding leg of each U-shaped member adapted to be spaced from the opposite side of said carriage, a cross-bar connecting the ends of said last mentioned members, each connection consisting of a pin fixedly mounted to said carriage and adapted to pass through and slidably engage both said cross-bar and the related end of said U-shaped member, and a spring member interposed between the said last mentioned member and said carriage.

RUTHERFORD B. CHASE.